United States Patent [19]
Richards

[11] Patent Number: 5,775,263
[45] Date of Patent: Jul. 7, 1998

[54] SCRATCH POST WITH VERTICAL ROTATABLE TREAD PATH

[76] Inventor: Thomas F. Richards, 15 Amherst Apartment 4L, Milford, N.H. 03055

[21] Appl. No.: 951,172

[22] Filed: Oct. 15, 1997

[51] Int. Cl.$^6$ ................................................ A01K 29/00
[52] U.S. Cl. ........................................................ 119/706
[58] Field of Search ............................... 119/700, 702, 119/706, 707, 709, 710, 711

[56] References Cited

U.S. PATENT DOCUMENTS

| | | |
|---|---|---|
| D. 206,579 | 1/1967 | Sherwood . |
| D. 240,306 | 6/1976 | Suchowski et al. . |
| D. 254,815 | 4/1980 | Kossar . |
| D. 333,887 | 3/1993 | Leopold . |
| 3,682,477 | 8/1972 | Harkins ........................ 119/700 |
| 4,996,946 | 3/1991 | Olson ........................... 119/706 |
| 5,114,390 | 5/1992 | Tribelhorn, Jr. ............. 119/700 |
| 5,450,819 | 9/1995 | Gray et al. . |
| 5,474,026 | 12/1995 | Wohltjen ..................... 119/706 X |

FOREIGN PATENT DOCUMENTS

| | | |
|---|---|---|
| 525227 | 8/1940 | United Kingdom . |
| 2 132 464 | 7/1984 | United Kingdom . |
| 2 239 159 | 6/1991 | United Kingdom . |

*Primary Examiner*—Thomas Pace
*Attorney, Agent, or Firm*—Richard C. Littman

[57] ABSTRACT

A scratch post having a vertical and rotatable tread path which exercises cats or other animals by a treading action of the forelimbs of the animal while in a stationary and upright posture. The scratch post for treading comprises a freestanding base and a vertical treadmill portion. The vertical treadmill portion includes a frame, which has an upper end portion and a lower end portion defining a vertical and longitudinal axis, the lower end portion being engaged to the base. The treadmill portion further includes a looped belt circumvolving the elongated frame vertically depending from the freestanding base. The outer surface of the belt is made of a material suitable for safely engaging the claws of a feline pet. A lighting and batting accessory is also provided.

20 Claims, 3 Drawing Sheets

SCRATCH POST WITH VERTICAL ROTATABLE TREAD PATH

BACKGROUND OF THE INVENTION

1. Field of the Invention

The present invention relates to a scratch post for exercising cats and other pets, more particularly, a scratch post having a vertically oriented treadmill belt rotated downward by the treading action of the forelimbs of the animal caused while the pet is pulling from an upright posture.

2. Description of the Related Art

Exercising an overweight, inactive or difficult to train feline pet presents an unenviable dilemma to the pet owner. Feline pets, i.e. cats, in particular are known to have very independent personalities, and to try and coax them into exercise by "Let's go for a walk" or "Want to play ball" usually elicits, at best, an indifferent stare.

To overcome this problem, various devices are known which try to take advantage of instinctual actions of the cat, such as clawing, batting, and a keen sense of smell and desire for catnip. Perhaps the most simple device is the carpeted scratch post, typically comprising a stationary, vertical wooden post covered by a durable fabric, such as pile carpet, which allows the cat to scratch, hang by its claws or stretch, thereby at least tangentially providing a place to which the pet can return for exercise. To attract the cat to the post, pockets containing catnip have been added to a scratch post to improve its effectiveness in initially attracting the cat to claw on it.

Variations of this device are abundant and range widely in structure and function. For example, U.S. Pat. No. Des. 206,579 issued Jan. 3, 1967 to Sherwood shows a vertically oriented scratch post having vertically oriented backing board and a segmented scratch component axially aligned on a dowel parallel to the board. The dowel has a spherical knob at its top, apparently seated on a carrier arm depending from the board. A similar invention is described in UK Pat. Application No. 2 239 159 published Jun. 26, 1991, in which a coiled rope is disposed about a similarly vertically oriented dowel seated by a knob on a carrier arm, which rope and dowel can be axially rotated to provide an even wear about its surface as the scratch post becomes worn. U.S. Pat. No. Des. 254,815 issued Apr. 22, 1980, to Kossar shows a cat exerciser, generally trapezoidal in appearance, having two, apparently carpeted, inclined walls. U.S. Pat. No. 5,450,819 issued Sep. 19, 1995, to Gray et al. describes a elongated free standing rectangular framework having a rope wrapped thereabout. Unlike the present invention, none of these patents disclose an exercise device incorporating a rotary, vertically oriented treadmill.

However, other devices not apparently intended for use by cats, describe rotary exercise devices. U.S. Pat. No. Des. 240,306 issued Jun. 15, 1976, to Suchowski et al. illustrates a rotary exercise wheel mounted on a single axle depending from a stand, the wheel portion having drum-like appearance with coplanar, circular transparent side walls connected by a transparent circumferential cross member. The transparent walls are reasonably inferred to be in the nature of plastic, and the device therefore intended as a hamster or bird wheel, which typically have a similar appearance. In contrast to the wheel, U.S. Pat. No. Des. 333,887 issued Mar. 9, 1993, to Dowler illustrates a horizontally oriented pet treadmill, having a pair of side rails. A similar horizontally oriented, and incline adjustable, treadmill for dogs and other pets is shown in British Pat. Specification No. 525,227 accepted Aug. 23, 1940. For even larger animals, such as horses, an inclined treadmill transportable on a wheeled frame is described in UK Pat. Application No. 2 132 464 published Jul. 11, 1984. Each of these patents fail to reasonably teach the use of a vertically rotatable tread path in the nature of a scratch post which permits a cat to claw into or pull downwardly on the tread path.

Most notably, U.S. Pat. No. 5,275,127 issued Jan. 4, 1994, to Leopold describes a device for scratching and clawing by a cat which comprises a cylindrical rotary drum having a base in which a tray is provided for receiving catnip to attract the cat to the scratch post. The rotary drum is preferably covered with sisal fabric to aid clawing. Although a rotating cylinder is disclosed as the preferred embodiment for scratching, the invention suffers from the main disadvantage that the rotating member fails to allow the natural upright posture of a cat during clawing to be accommodated.

Because the Leopold invention teaches that, for the safety of the cat, removable end brackets must be provided as arms supporting the rotation of the drum, and the drum can be any shape "provided it is permitted to rotate . . . for example, square, rectangle, hexagon or octagon", such rotation necessitates that the member revolve about a single rotational axis. Therefore, unlike the present invention, the Leopold invention fails to teach the use of an upright or vertically oriented freestanding treadmill which confers the advantage of permitting the cat to claw at full body length and maintain its balance as the tread path is pulled downward. In contrast, a rotary device would cause the cat to fall forward after reaching a point of rotation below horizontal. Moreover, the sisal is firmly attached to a drum, unlike a flexible belt forming a tread path of a treadmill.

None of the above inventions and patents, taken either singularly or in combination, is seen to describe the instant invention as claimed. Thus, a scratch post for forelimb treading solving the aforementioned problems is desired.

SUMMARY OF THE INVENTION

The present invention is a scratch post for exercising cats and other pets, more particularly, a scratch post having a vertically oriented treadmill belt rotated downward by the treading action of the forelimbs of the animal caused while the pet is pulling from an upright posture. The scratch post for treading comprises a freestanding base and a vertical treadmill portion. The vertical treadmill portion includes a frame, which has an upper end portion and a lower end portion defining a vertical and longitudinal axis, the lower end portion being engaged to the base. The treadmill portion further includes a looped belt circumvolving the elongated frame vertically depending from the freestanding base. The outer surface of the belt is made of a material suitable for safely engaging the claws of a pet, and is preferably a rubber material, but may be a carpet material. An alternative version of the belt includes a rope or corduroy surface providing raised protrusions for declawed pets to make use of the device.

The looped belt rotates by means of a first axle and a second axle disposed in parallel relation to one another and depending from the elongated frame. In the preferred embodiment, the belt is frictionally engaged about both the first axle and second axle, and thereby revolve along a continuous path along the longitudinal axis, thus generally defining a treadmill. The treadmill portion may also include an adjustment mechanism for altering the vertical height of said frame relative to said base and a belt tensioning mechanism for maintaining the looped belt in frictional engagement with said first axle and said second axle and thereby prevent slipping of the belt.

Other accessory features include a battering assembly which helps induce a cat to use the scratch post for treading, the assembly including a container for holding catnip while permitting diffusion of its scent which hangs from a support arm over the frame. Another entertaining feature is a lighting assembly including a light source housing simulative of a mouse having eyes each of which contain a light source such as an LED. A motion sensor housed in the base is responsive to motion of the looped belt caused by a cat, which thereafter activates a circuit electrically coupling the motion sensor to the light source and a power source, such as a battery. The circuit may further include an interrupter for momentarily interrupting the electrical circuit and thereby cause a flickering of the light source in the mouse's eyes.

Alternative embodiments may include a generator to generate electrical current sufficient to activate the light source during rotation of the looped belt by the pet. Also, the scratch post for treading may include a pivot mechanism for angularly adjusting and fixing the incline of the vertical treadmill portion relative to the freestanding base. Also, the scratch post for treading may further include a resistance means for limiting the rate of rotation of said looped belt about said first and second axles, thereby adding further effort by the pet during its exercise.

Accordingly, it is a principal object of the invention to provide a device for the exercise of a pet.

It is another object of the invention to provide a device which serves as a scratch post while exercising a cat.

It is a further object of the invention to provide a device which induces a cat to exercise during the course of its instinctive actions including clawing, stretching and batting.

Still another object of the invention is to provide an entertaining exercise device for both pet and owner.

It is an object of the invention to provide improved elements and arrangements thereof in a scratch post for forelimb treading for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE EMBODIMENTS

Figure 1:
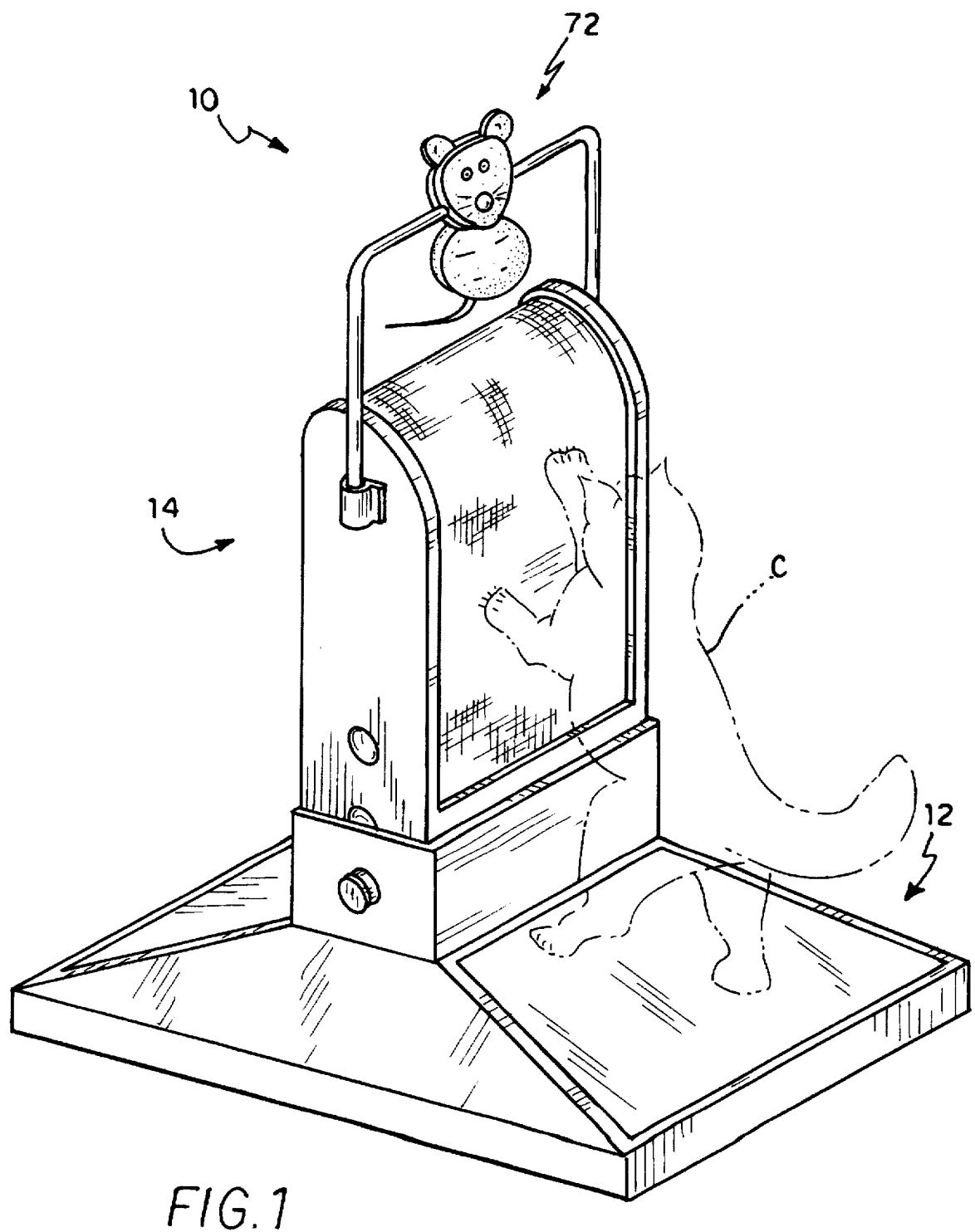
FIG. 1 is an environmental, perspective view of a preferred embodiment of a scratch post for forelimb treading according to the present invention.

The present invention is a scratch post for exercising cats and other pets, more particularly, a scratch post having a vertically oriented treadmill belt rotated downward by the treading action of the forelimbs of the animal caused while the pet is pulling from an upright posture. Referring to FIG. 1, a preferred embodiment of a scratch post 10 according to the present invention is shown having two main components: a freestanding base 12 and a vertical treadmill portion 14. The treadmill portion 14 is configured and dimensioned so that a naturally clawed pet, such as a cat, when standing on or near the base 12 can easily stretch to its full length and thereby perform its clawing exercises on the treadmill portion 14. As can be seen in phantom lines, a cat C is positioned in a generally upright posture on the scratch post 10, with its rear legs standing on the base 12 and its forelimbs reaching upward and forward to claw the treadmill portion 14. This position is natural for both clawed and declawed felines.

Figure 2:
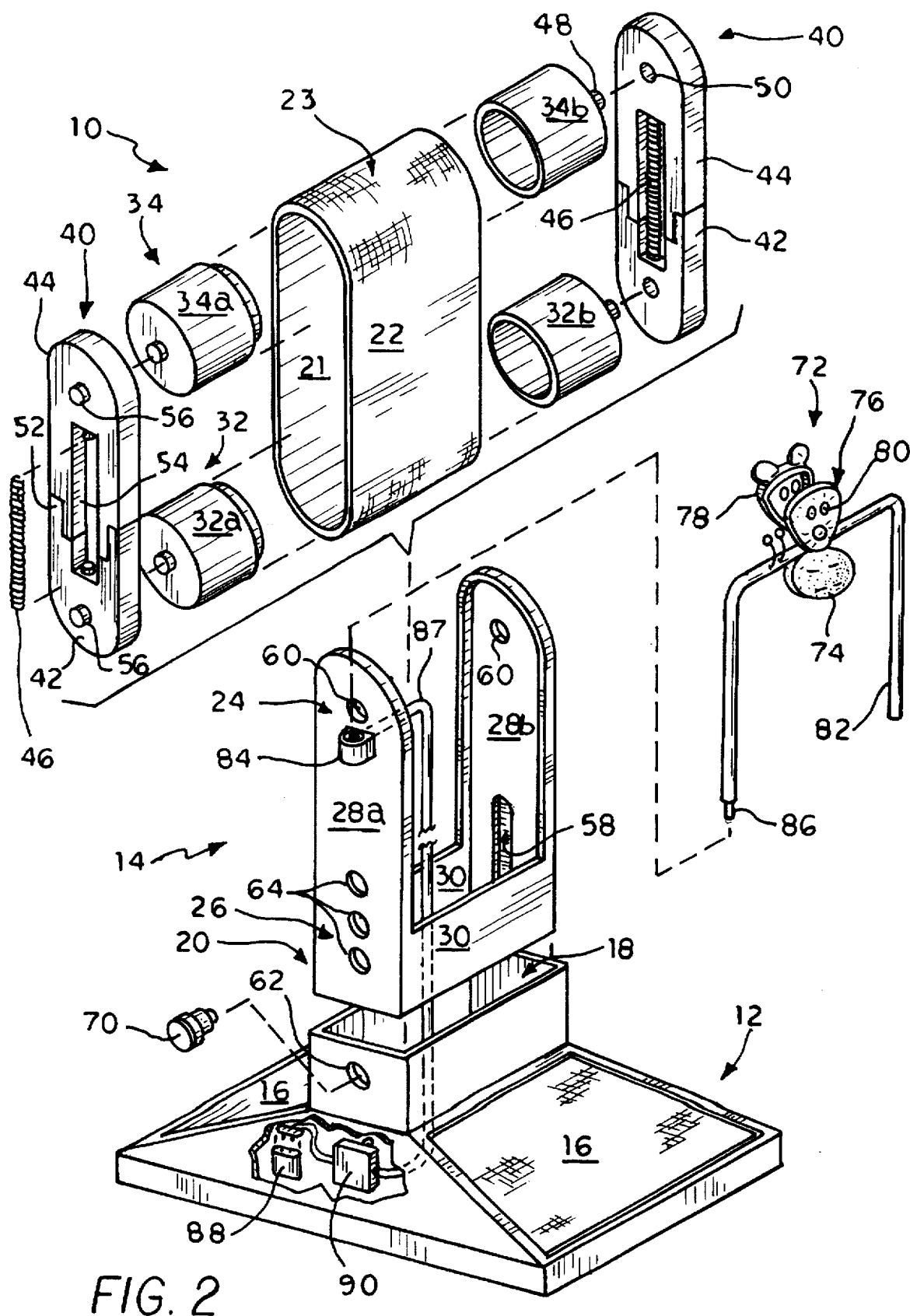
FIG. 2 is an exploded, perspective view of the scratch post for forelimb treading according to the present invention as shown in FIG. 1.

Referring to both FIG. 1 and FIG. 2, in the preferred embodiment the base 12 includes a pair of inclined surfaces 16 which provide a place for the pet to stand. Between the inclined surfaces 16, the base defines an upwardly facing mouth 18 for slidably receiving the treadmill portion 14.

Belt and axle components in combination with a frame are well known to generally define a treadmill; however, significantly, in the present invention, the treadmill portion 14 is vertically oriented. The treadmill portion 14 comprises a looped belt 22 circumvolving an elongated frame 20 vertically depending from the mouth 18 of the base 16. The frame 20 comprises a pair of arms, a first arm 28a and a second arm 28b, each integrally formed by an upper end portion 24 and a lower end portion 26, which define a longitudinal axis therebetween for the frame 20. The arms 28 are disposed coplanar to one another, held in such a relationship by cross braces 30, thereby defining an interior surface for each arm. The interior surfaces face each the other and define a space therebetween, dimensioned to receive the belt 22 in a vertical orientation. The lower end portion 26 is slidably engaged to the base 14, dimensioned and configured to closely fit into said mouth 18, which in the preferred embodiment is rectangular.

In each embodiment, the belt 22 is permitted to revolve about the frame 14 by means of a first axle 34, comprising two mating cylindrical parts 34a and 34b for ease of manufacture and assembly, and a second axle 32, comprising similar cylindrical mating parts 32a and 32b. The axles 34, 32 are disposed in parallel relation to one another and depend, either directly or indirectly, from each arm 28a and 28b of the frame 20. In the preferred embodiment, the axles 34, 32 are indirectly attached to the arms 28a, 28b by a belt tensioning mechanism 40. In a second embodiment described more fully later in reference to FIG. 3, each axle 134, 132 is directly and rotationally attached to arms 128a, 128b. In each embodiment, the belt 22 is frictionally engaged about the first axle 34 and the second axle 32 to revolve along a continuous path which travels in reversing directions substantially along the longitudinal axis. Because the belt 22 is pliable, the belt 22 has a maximum inner diameter of the belt 22 caused by spreading the belt in diametrically opposite directions; the axles 34, 32 are positioned on the frame 20 near the maximum diameter in order to permit frictional engagement.

Figure 3:
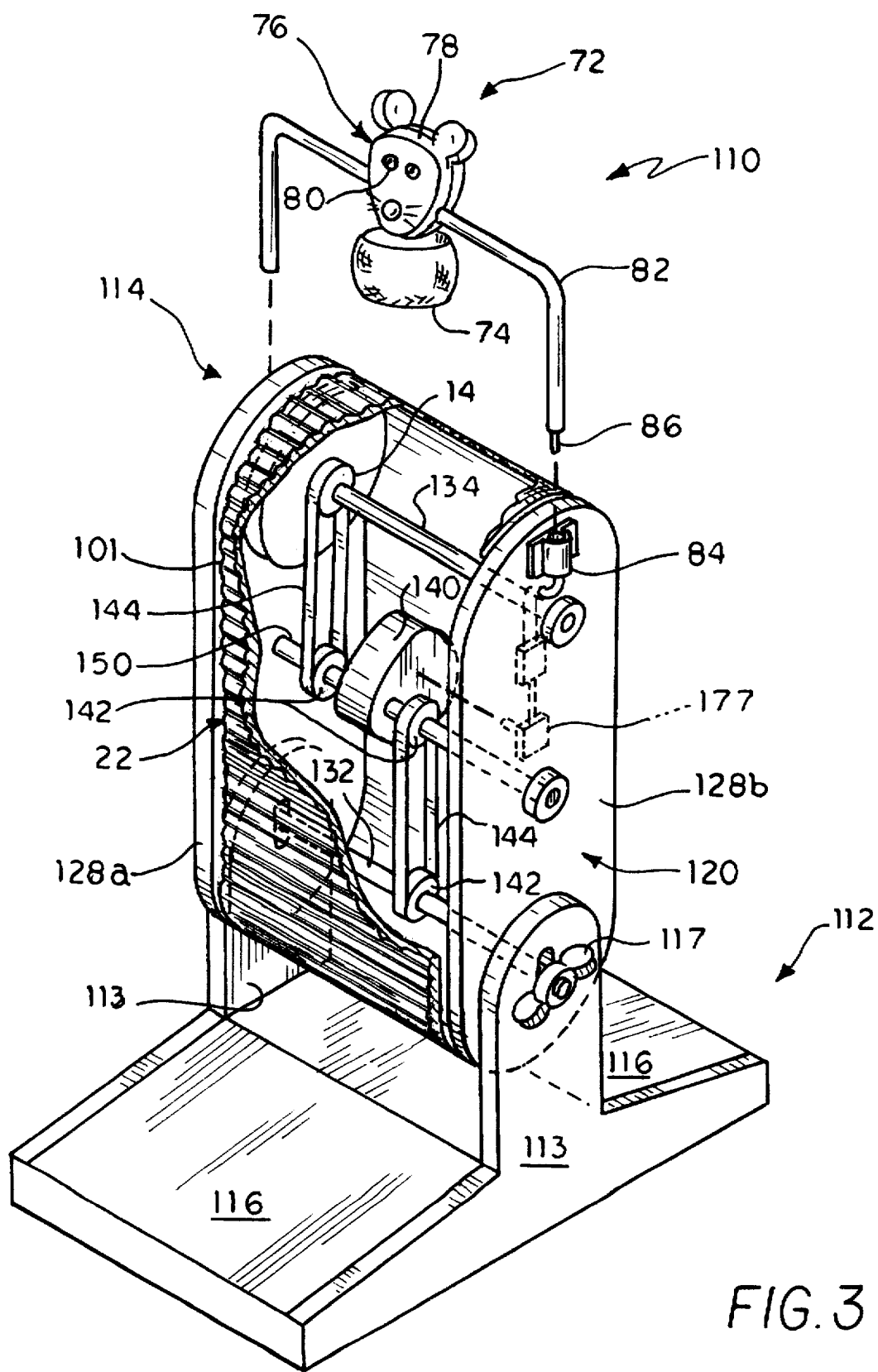
FIG. 3 is an partially fragmented, partially exploded, perspective view of a second embodiment of the scratch post for forelimb treading according to the present invention.

The looped belt 22 is made of a pliable material which includes an outer surface for safely engaging claws of an animal or, for declawed pets, altered to have a raised corduroy surface. Preferably for clawed pets, this material is manufactured of a pliable fabric having rubberized outer surface 23. In the alternative, a carpet material including a woven backing and a nap may be chosen; however, this material is a not preferred in light of the tendency of the pet to learn that such carpet material exists on home floors and thus inadvertently claw on a carpeted floor instead of the present invention. However, should carpet material be used, the woven backing faces inward towards the first and second axles 34, 32, thereby defining an interior surface 21 of the looped belt 22, and the napped outer surface 23 thus faces outwardly. For declawed pets, the outer surface of the belt 22 is a raised or corduroy surface 101, as shown in FIG. 3, preferably made of a plurality of rope segments horizontally banded into a continuous belt. The rope provides both the texture necessary for clawing and a ridged surface permitting rotation of the belt by declawed pets.

The preferred embodiment of FIG. 2 is also provided with a belt tensioning mechanism for maintaining the looped belt 22 in tight frictional engagement with the first and second axles 34, 32. An exemplary and preferred version of the belt tensioning mechanism comprises a pair of identical expansion assemblies 40, 40, each acting in cooperation with the frame 20 and each axle 32, 34. Each expansion assembly 40 includes a first member 44 and a second member 42 which are independent and positioned within the interior space and along the longitudinal axis of the frame 20.

The first axle 34 is rotationally attached to the first member 44, and the second axle 32 is rotationally attached to the second member. A simple means of holding the axles 32, 34 to the first and second members 44, 42 and provide rotational motion is a simple dowel 48 and bore 50 arrangement, the dowel 48 being inserted within the bore 50. The axles 34, 32, are positioned parallel to one another between the pair of assemblies 40. The first and second members 44, 42 include interacting arms 52, 54 which engage with one another to act as stops to limit movement of the members 44, 42 toward one another, in order to prevent the disengagement of the axles 34, 32 from the belt 22.

In order for the axles 34, 32 to be tightly and frictionally engaged with the belt, the first and second members 44, 42 are biased apart by a spring 46 or other means for forcing the first and second members 34, 32 apart along the longitudinal axis of the frame 20. The interacting arms 52, 54 must be dimensioned to permit the first and second member 44, 42 to be positioned slightly inward of the maximum inner diameter of the pliable belt 22 when deformed along the longitudinal axis, thus permitting the spring 46 to bias each of the first and second members 44, 42 outwardly against the belt 22.

In order to allow the biasing force of the spring 46 to in turn act against the belt 22, in the preferred embodiment, the first member 44 of each assembly 40 is held in fixed rotatable relationship with the upper end portion 44 an arm 28a, 28b whereas the second member 42 is reciprocally positionable along the longitudinal axis of the frame 20 near the lower end portion 26. This allows the spring 46 to downwardly bias the second member 42 against a fixed first member 44. Obviously, this arrangement may be reversed to allow a spring to push upwards instead. A simple attachment means by which the preferred arrangement can be accomplished is by a stud and recess arrangement, a stud 56 extending from each the first and second members 44, 42 towards the interior face of each arm 28a, 28b. On the interior face of each arm 28a, 28b, a groove 58 is positioned along the longitudinal axis of the lower end portion 26 of frame 20 to receive the stud 56 of the second member 42, whereas a cavity or hole 60 is defined in the upper end portion 24 to fixedly receive the stud 56 of the first member 44. Thus, a reciprocal sliding motion is allowed by the second member 42 by means of stud 56 within groove 58. The axles 34, 32 are dimensioned in length to both allow rotation and provide diametrically opposing forces, each acting toward an opposing interior face of the arms 28a, 28b to mechanically hold the first and second members 44, 42 in place.

The frame 20 of the preferred embodiment is also height adjustable relative to the freestanding base 12. An exemplary means to accomplish this objective is shown wherein the lower end portion 26 of the frame 20 is dimensioned and configured to be telescopingly received by the mouth 18 of the base 12. The lower end portion 26 is slidably engaged so as to vertically orient the frame 20, thus permitting raising or lowering of the treadmill portion 14 relative to the base 12 to accommodate differently sized cats. To fix the relative positions, a locking means for temporarily fixing the frame 20 at a desired position within the mouth 18 is provided. The locking means is an pin and registered aperture arrangement, in part defined by the base 12 further defining an throughaperture 62 in communication with the cavity of the mouth 18. The frame 20 includes a series of detents 64 vertically positioned along the longitudinal axis of each arm 28a, 28b. Each of the detents 64 is positioned to be brought into registry with the aperture 62. A locking member 70 is provided which is dimensioned to reside in and pass through the aperture 62 and engages one of the detents 64, thereby selectively retaining it and the aperture 62 in registry. Any other means for the locking and preserving a selective relationship between the frame 20 and the base 12 as may be known in the prior art may be used.

Each of the embodiments shown in FIGS. 2 and 3 also may include an accessory, namely battering assembly 72, which contains catnip to attract the cat to the exercising device. The assembly 72 comprises a container 74 for holding catnip and a support arm 82 which depends upwardly from the frame 20 to support the container 74 in a manner which is distal from the upper end portion 24 and permits the cat to bat at the container 74. The support arm 82 may be attached by any suitable means known in the art which permits the arm to be removed for ease of assembly and disassembly of the device. A simple well 84 attached to the exterior surface of the arms 28a, 28b for insertion of the support arm terminus 86 is shown.

The container 72 should be made of a flexible, durable material permitting diffusion of its scent through its walls. In a preferred version, the container 74 is shown suspended from a lighting assembly 76 which is also supported by the support arm 82 and includes a light source housing 78 simulative of a mouse having eyes. A light source 80 is positioned in the housing where the eyes are located in the simulative mouse. The light source 80 is preferably an LED, however, light bulbs may be used. This novelty lighting assembly 76 is provided for both the entertainment of the cat and its owner, and when energized, causes the light source 80 to flash, stimulating the cat and amusing its owner. Thus, a remote power source 88 is provided in the base 12 to energize the light source 80. The power source 88 is preferably a household battery.

The power source 88 and light source 80 are electrically coupled by a circuit including the necessary wiring 87 and switching means. One such switching means may be a motion sensor 90 which activates the light source when sensing motion of the looped belt 22, the motion likely caused by the cat treading on the treadmill portion 14. The motion sensor 90 is housed in the base 12 unobstructed below the belt 22 and is thus responsive to its motion. The sensor 90 or circuit may also include a time-delay means (shown housed in 90) well known in the art for delaying by a predetermined time period the electrical coupling of the battery with the light source, thereby delaying activation of the light source 80. Moreover, the circuit or sensor 90 may further include an interrupter means (shown housed in 90) for momentarily interrupting the electrical coupling of the battery with the light source thereby resulting in a flickering or flashing of the light source 80.

Turning now to the second embodiment 110 shown in FIG. 3, the base 112 and frame 120 are modified as compared to the first embodiment to permit angular adjustment of the treadmill portion 114 relative to the base 112. The base 112 includes a pair of inclined surfaces 116 which provide a place for the pet to stand. Between the inclined surfaces 116, the base defines a pair of upright supports 113 between which the frame 120 is disposed. The frame 120 and upright supports 113 are joined by pivoting means for angularly adjusting and fixing the incline of the vertical treadmill portion 114 relative to the freestanding base 112. Such means may be a simple threaded extension of axle 132 passing through an aperture (not shown) provided in the frame 120, or in the alternative a threaded stud fixed to the exterior of the frame 120, and held to the strut by a matingly threaded wing nut 117 tightened onto the threaded portion.

The second embodiment 110 further includes a resistance means for limiting the rate of rotation of the looped belt 22 about the first and second axles 134, 132. The resistance means comprise a flywheel 140 affixed to a shaft 150 rotatably attached to the frame 120. The flywheel 140 is operably linked to at least one of the first axle 134 or the second axle 132, or both as shown in FIG. 3, such as by an interconnected series of pulleys 142 and bands 144 rotationally linking the axles 134, 132 to the shaft 150. The flywheel 140 stores energy as said looped belt 22 is rotated, initially resisting the clawing forces, and later releasing this energy to require the cat to keep up with the motion of the belt 22.

In addition, a electrical generator (schematically shown as box 177) may be added in lieu of the power source 88 and other circuit components to take advantage of the rotational energy about shaft 150 to generate electrical current sufficient to activate the light source 80. The generator 177 alternatively may be operably linked to one of the axles.

It is to be understood that the present invention is not limited to the embodiments described above, but encompasses any and all embodiments within the scope of the following claims.

I claim:

1. A scratch post for treading comprising:
    a freestanding base; and
    a vertical treadmill including
        a looped belt,
        an elongated frame vertically depending from said base, having an upper end portion and a lower end portion defining a longitudinal axis therebetween, said lower end portion engaged to said base;
        a first axle and a second axle disposed in parallel relation to one another and depending from said frame, said belt engaged about said first axle and said second axle to revolve along a continuous path about said first axle and said second axle and substantially along said longitudinal axis, thereby generally defining a treadmill.

2. The scratch post for treading as defined in claim 1 wherein said looped belt is made of a pliable material which includes an outer surface for safely engaging claws of an animal.

3. The scratch post for treading as defined in claim 1 wherein said looped belt is manufactured of a material selected from the group consisting of
    carpet material including a woven backing and a nap, said woven backing facing inward towards said first axle and said second axle, thereby defining an interior surface of said looped belt, and a napped outer surface;
    a pliable fabric having rubberized outer surface; and
    a material having a corduroy surface comprising a plurality of rope segments banded on said belt.

4. The scratch post for treading as defined in claim 1 further having adjustment means for altering the vertical height of said frame relative to said base.

5. The scratch post for treading as defined in claim 4, wherein said base defines an upwardly facing mouth for slidably receiving said lower end portion of said frame, said mouth and said lower end portion slidably engaged so as to vertically orient said frame, and a locking means for temporarily fixing said frame at a predetermined position within said mouth of said base.

6. The scratch post for treading as defined in claim 5, wherein said locking means is defined by said base further defining an aperture in communication with said mouth, said frame including a series of detents vertically positioned along said longitudinal axis and each of said series of detents positioned to be brought into registry with said aperture, and a locking member passing through said aperture of said base for selectively retaining one of said series of detents and said aperture in registry.

7. The scratch post for treading as defined in claim 1, further including a belt tensioning means for maintaining the looped belt in engagement with said first axle and said second axle.

8. The scratch post for treading as defined in claim 7, said belt tensioning means comprising an expansion assembly acting in cooperation with said frame;
    wherein said frame includes a first arm and a second arm, each having an upper end, a lower end, and an interior surface, said interior surface of said first arm and said second arm facing each the other and defining a space therebetween;
    said expansion assembly comprising
        a first member disposed within said space proximate said upper end portion of said frame and rotatably supporting said first axle,
        a second member disposed within said space proximate said lower end portion of said frame and rotatably supporting said second axle,
        biasing means for forcing said first member and second member apart along said longitudinal axis of said frame, and
        attachment means for operably connecting said first member in a fixed position relative to said interior surface of said frame and for operably connecting said second member in slidable relation to said interior surface and along said longitudinal axis of said frame;
    whereby said first axle is held stationary relative to said frame and said second axle is forced outwardly from said first axle along said longitudinal axis thereby creating a tension on said belt.

9. The scratch post for treading as defined in claim 8, said tensioning means further including a pair of expansion assemblies, each of said first and second members of each of said pair bounding said first and second axles respectively, each one of said pair of expansion assemblies disposed proximate a different one of said first arm and said second arm of said frame.

10. The scratch post for treading as defined in claim 1, further including a battering assembly comprising:
    a container for holding catnip while permitting diffusion of its scent; and
    a support arm depending from said frame and supporting said container distal from upper end portion of said frame.

11. The scratch post for treading as defined in claim 1, further including a lighting assembly comprising:

a power source;

a light source housing simulative of a mouse having eyes;

a light source positioned in said eyes;

a motion sensor housed in said base and responsive to motion of said looped belt; and a circuit electrically coupling said motion sensor to said light source and said power source to activate said light source during motion of said looped belt.

12. The scratch post for treading as defined in claim 11, wherein said circuit includes a time-delay means for delaying the electrical coupling of said battery with said light source by a predetermined time period, thereby delaying activation of said light source.

13. The scratch post for treading as defined in claim 11, wherein said circuit further includes interrupter means for momentarily interrupting the electrical coupling of said battery with said light source thereby resulting in a flickering of said light source.

14. The scratch post for treading as defined in claim 11, wherein said light source is selected from the group consisting of LEDs and light bulbs and said power source is a battery.

15. The scratch post for treading as defined in claim 11, wherein said power source is a generator for the generation of electrical current sufficient to activate said light source, said generator operably linked to one of said first axle and said second axle thereby generating electricity during rotation of said looped belt.

16. The scratch post for treading as defined in claim 15, said freestanding base including a pair of upright supports, said elongated frame vertically depending from said base between said pair of upright supports, said lower end portion of said elongated frame engaged to said upright supports by said pivoting means.

17. The scratch post for treading as defined in claim 1, further including pivoting means for angularly adjusting and fixing the incline of said vertical treadmill relative to said freestanding base.

18. The scratch post for treading as defined in claim 17, each of said pair of upright supports defining an aperture, said pivoting means comprising a threaded stud attached to said frame and passing through said aperture, and a matingly threaded locking component for tightening said frame and said stud together.

19. The scratch post for treading as defined in claim 18, said resistance means comprising a flywheel operably linked to at least one of said first axle and said second axle for storing energy as said looped belt is rotated.

20. The scratch post for treading as defined in claim 1, further including resistance means for limiting the rate of rotation of said looped belt about said first and second axles.

* * * * *